US012567697B2

(12) United States Patent
Jung et al.

(10) Patent No.: US 12,567,697 B2
(45) Date of Patent: Mar. 3, 2026

(54) RECEPTACLE CONNECTOR

(71) Applicant: SAMSUNG ELECTRONICS CO., LTD., Suwon-si (KR)

(72) Inventors: Waneui Jung, Suwon-si (KR); Hanseok Mun, Suwon-si (KR); Jaeryong Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 334 days.

(21) Appl. No.: 18/374,446

(22) Filed: Sep. 28, 2023

(65) Prior Publication Data

US 2024/0030648 A1 Jan. 25, 2024

Related U.S. Application Data

(63) Continuation of application No. PCT/KR2022/005408, filed on Apr. 14, 2022.

(30) Foreign Application Priority Data

Apr. 27, 2021 (KR) ........................ 10-2021-0054428

(51) Int. Cl.
*H01R 13/52* (2006.01)
*H01R 13/405* (2006.01)

(52) U.S. Cl.
CPC ..... *H01R 13/5202* (2013.01); *H01R 13/5216* (2013.01); *H01R 13/405* (2013.01)

(58) Field of Classification Search
CPC ........................ H01R 13/5202; H01R 13/5216
(Continued)

(56) References Cited

U.S. PATENT DOCUMENTS 2,677,811 A * 5/1954 Anderson .......... H01R 13/6277 439/903
7,445,452 B1 11/2008 Wu
(Continued)

FOREIGN PATENT DOCUMENTS

CN 204885711 U 12/2015
CN 108538466 A 9/2018
(Continued)

OTHER PUBLICATIONS

Extended European Search Report dated Jul. 4, 2024, issued by the European Patent Office in European Application No. 22796011.9.
(Continued)

*Primary Examiner* — Phuong K Dinh
(74) *Attorney, Agent, or Firm* — Sughrue Mion, PLLC

(57) ABSTRACT

A receptacle connector includes a shell including a shell body and a shell stopper connected to the shell body; a terminal provided inside the shell body; a core body including a core base supporting the terminal and a parting part protruding from the core base; and a main body including: a center part including a main protrusion configured to move in a first direction in the shell and to be caught by the shell stopper; an exposed part protruding from the center part in the first direction and covering at least a portion of the terminal; and a non-exposed part protruding from the center part in a second direction opposite to the first direction, wherein the parting part is bonded to the center part or the non-exposed part.

20 Claims, 13 Drawing Sheets

(58) Field of Classification Search
USPC ....... 439/607.36, 607.4, 607.41, 607.01, 903
See application file for complete search history.

(56) References Cited

U.S. PATENT DOCUMENTS

| | | | | |
|---|---|---|---|---|
| 8,071,895 | B2 | 12/2011 | Shiu et al. | |
| 8,475,216 | B2 * | 7/2013 | Tung .................... | H01R 13/506<br>439/660 |
| 2010/0124010 | A1 | 5/2010 | Shiu et al. | |
| 2018/0183184 | A1 | 6/2018 | Tsai | |
| 2020/0388951 | A1 | 12/2020 | Choi et al. | |
| 2021/0006001 | A1 | 1/2021 | Baek et al. | |

FOREIGN PATENT DOCUMENTS

| | | | |
|---|---|---|---|
| JP | 2019 75301 | A | 5/2019 |
| KR | 10-1392997 | B1 | 5/2014 |
| KR | 10-1532720 | B1 | 6/2015 |
| KR | 10-2016-0075198 | A | 6/2016 |
| KR | 10-2016-0095396 | A | 8/2016 |
| KR | 10-2018-0077078 | A | 7/2018 |
| KR | 10-2021-0004774 | A | 1/2021 |

OTHER PUBLICATIONS

Communication dated Oct. 21, 2025 issued by the Japan Patent Office in Japanese Patent Application No. 2023-565547.

* cited by examiner

RECEPTACLE CONNECTOR

CROSS-REFERENCE TO RELATED APPLICATIONS

This application is a by-pass continuation of International Application No. PCT/KR2022/005408 filed on Apr. 14, 2022, which is based on and claims priority to Korean Patent Application No. 10-2021-0054428, filed on Apr. 27, 2021, in the Korean Intellectual Property Office, the disclosures of which are incorporated by reference herein in their entireties.

BACKGROUND

1. Field

The disclosure relates to a receptacle connector.

2. Description of Related Art

An electronic device may be physically and electrically connected to another electronic device via a connector. The electronic device may transmit and receive data to or from another electronic device by connecting to the other electronic device or may be charged by connecting to a charger.

Typically, the connector may include a plug connector and a receptacle connector. The receptacle connector may be mounted on a printed circuit board (PCB) and the like of the electronic device and may be coupled to a plug connector. The receptacle connector may include a plurality of terminals, a mold body supporting the terminals, and a housing enclosing the mold body.

The terminals may be arranged, for example, in a form satisfying a universal serial bus (USB) pin standard. The terminals may be mutually insulated and retained by the mold body and may be shielded from the outside by the housing enclosing the mold body.

Recently, as the charging capacity of a smartphone increases, the corrosion of a receptacle connector used as a charging terminal may easily occur. In addition, as the standard is converted from a micro B-type to a C-type, the size of a hole exposed to the outside in the receptacle connector has been increased.

Twenty-four terminals of the receptacle connectors may be configured based on the USB communication specification. For example, the terminals of the receptacle connector may be divided into 12 on the top and bottom surfaces of the mold body, respectively, and thus, may have a vertically symmetrical structure. Typically, the receptacle connector may be manufactured by multi-component injection. In other words, the mold body may include at least two bodies bonded to each other. Due to this, a joint surface may exist between the bodies. A fine gap may exist on the joint surface between the two adjacent bodies of the plurality of bodies.

When an edge of a joint surface between a plurality of bodies constituting a mold body is exposed to the outside, moisture may enter through a fine gap. The moisture flowing from the outside may enter a terminal. Water accumulated inside the mold body may not easily dry and may cause slight resistance between two adjacent terminals among a plurality of terminals. The resistance caused by moisture may form an electrical path and may cause the corrosion of two adjacent terminals.

There is a demand for a technique of implementing a waterproof structure to prevent an inflow of moisture through a gap formed between a plurality of bodies constituting a mold body.

SUMMARY

According to an aspect of the disclosure, a receptacle connector includes: a shell including a shell body and a shell stopper connected to the shell body; a terminal provided inside the shell body; a core body including a core base supporting the terminal and a parting part protruding from the core base; and a main body including: a center part including a main protrusion configured to move in a first direction in the shell and to be caught by the shell stopper; an exposed part protruding from the center part in the first direction and covering at least a portion of the terminal; and a non-exposed part protruding from the center part in a second direction opposite to the first direction, wherein the parting part is bonded to the center part or the non-exposed part.

The receptacle connector may further include a gap formed at a joint portion between the parting part and the main body and opening toward an inner side surface of the shell body.

The gap may extend in the second direction relative to the shell stopper.

A joint portion between the exposed part and the core base may be covered by at least one of the main body and the terminal.

The non-exposed part may enclose the parting part.

The receptacle connector may further include a resin layer configured to decrease an inflow of moisture into the non-exposed part.

The resin layer may cover a joint portion between the parting part and the non-exposed part.

The resin layer may be configured to decrease an inflow of moisture in the second direction through a gap between the shell body and the main protrusion.

The resin layer may contact an inner side surface of the shell body and overlap at least a portion of the main body in the first direction.

The receptacle connector may further include a plurality of terminals including the terminal, the plurality of terminals being arranged in a to satisfy a universal serial bus (USB) type-C pin standard.

The core body may further include: a first injection part including a first portion of the core base and the parting part; and a second injection part bonded to the first injection part and including a second portion of the core base which is different from the first portion of the core base.

The receptacle connector may further include a plurality of terminals including the terminal, and one of the plurality of terminals may be connected to the first injection part and another one of the plurality of terminals may be connected to the second injection part.

According to an aspect of the disclosure, an electronic device includes: a case including a case body and a case stopper protruding from an inner side surface of the case body, wherein the case is configured to accommodate one or more components of the electronic device; and a receptacle connector disposed within the case, the receptacle connector including: a terminal provided inside the case body; a core body including a core base supporting the terminal and a parting part protruding from the core base; and a main body including: a center part including a main protrusion configured to move in a first direction in the shell and to be caught by the case stopper; an exposed part protruding from the center part in the first direction and covering at least a portion of the terminal; and a non-exposed part protruding from the center part in a second direction opposite to the first direction, wherein the parting part is bonded to the center part or the non-exposed part.

The receptacle connector may further include a gap formed at a joint portion between the parting part and the main body, and the gap may open toward the inner side surface of the case body.

The gap may be disposed in the second direction relative to the case stopper.

A joint portion between the exposed part and the core base may be covered by at least one of the main body and the terminal.

The non-exposed part may enclose the parting part.

The core body may further include: a first injection part including a first portion of the core base and the parting part; and a second injection part bonded to the first injection part and including a second portion of the core base which is different from the first portion of the core base.

The receptacle connector may further include a plurality of terminals including the terminal, and one of the plurality of terminals may be connected to the first injection part and another one of the plurality of terminals may be connected to the second injection part.

According to an aspect of the disclosure, a receptacle connector includes: a shell including a shell body and a shell stopper connected to the shell body; a terminal provided inside the shell body; a core body including a core base supporting the terminal and a parting part protruding from the core base; a main body including: a center part including a main protrusion configured to move in a first direction in the shell and to be caught by the shell stopper; an exposed part protruding from the center part in the first direction and covering at least a portion of the terminal; and a non-exposed part protruding from the center part in a second direction opposite to the first direction; and a resin layer configured to decrease an inflow of moisture into the non-exposed part, wherein the parting part is bonded to the center part or the non-exposed part, and the resin layer contacts an inner side surface of the shell body and is configured to decrease an inflow of moisture in the second direction through a gap between the shell body and the main protrusion.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
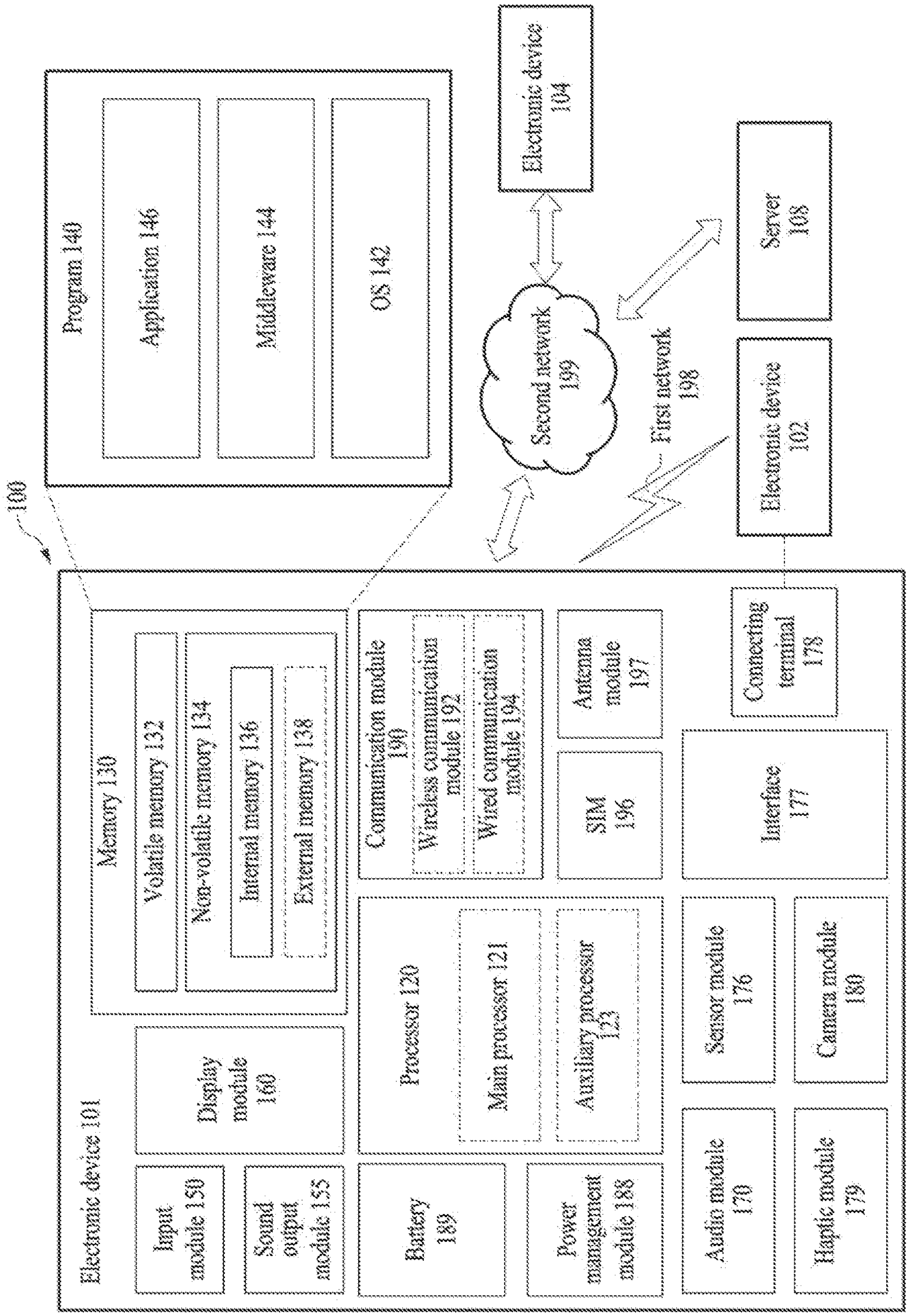
FIG. 1 is a block diagram illustrating an electronic device in a network environment according to an embodiment.

Hereinafter, embodiments will be described in detail with reference to the accompanying drawings. When describing the embodiments with reference to the accompanying drawings, like reference numerals refer to like elements and a repeated description related thereto will be omitted.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "1st," "2nd," or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used herein, a module may be a single integral component, or a minimum unit or part thereof, adapted to perform one or more functions. A module may be a single integral component, or a minimum unit or part thereof, adapted to perform one or more functions.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory

130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In one or more embodiments, at least one (e.g., the connecting terminal 178) of the above components may be omitted from the electronic device 101, or one or more other components may be added in the electronic device 101. In one or more embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to one embodiment, the display module 160 may include a touch sensor adapted to sense a touch, or a pressure sensor adapted to measure an intensity of a force incurred by the touch.

The audio module 170 may convert a sound into an electric signal or vice versa. According to one embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or mobile edge computing. In one embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the present disclosure, the electronic device is not limited to those described above.

Figure 2A:
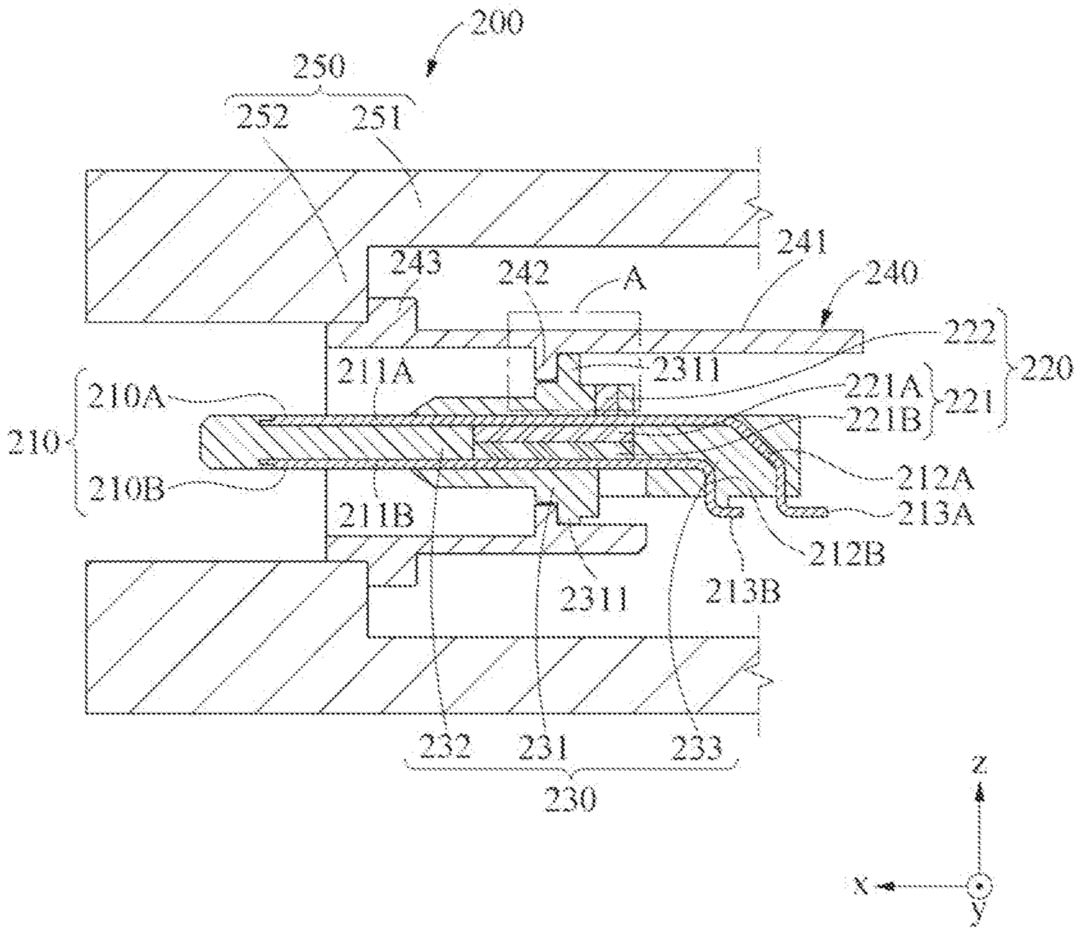
FIG. 2A is a cross-sectional view of a receptacle connector according to an embodiment.
Figure 2B:
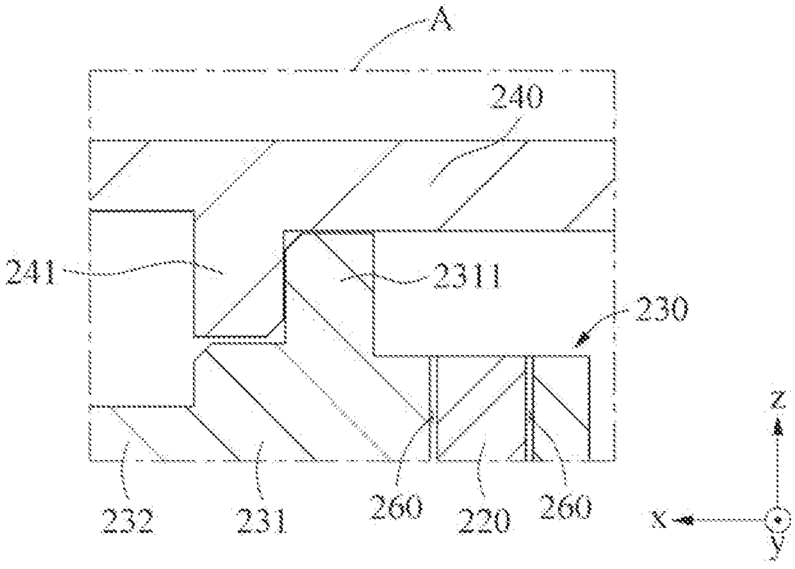
FIG. 2B is an enlarged view of area A of FIG. 2A.
Figure 2C:
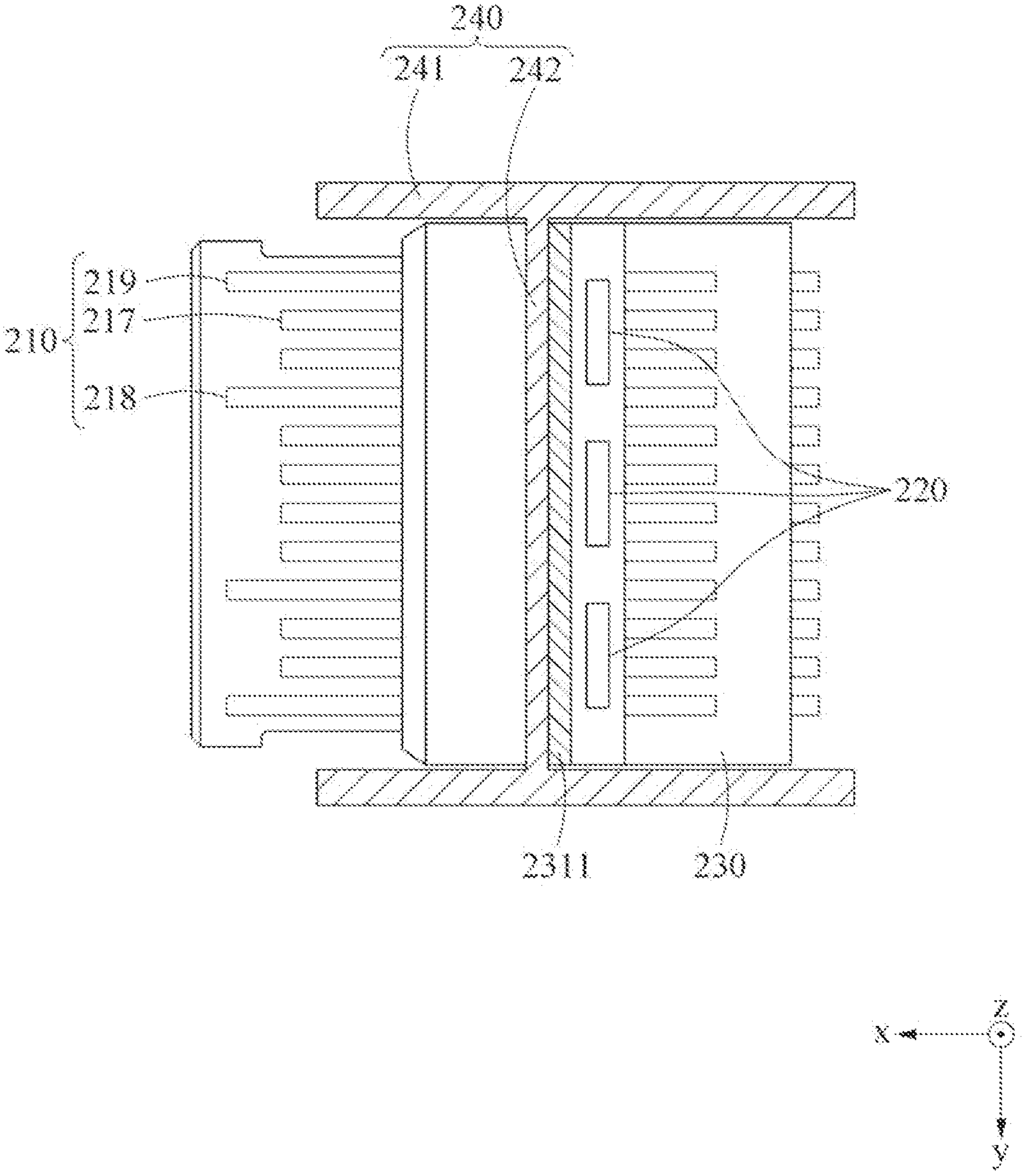
FIG. 2C is a cross-sectional view of the receptacle connector of FIG. 2A when viewed from a different direction, according to an embodiment.

FIG. 2A is a cross-sectional view of a receptacle connector according to an embodiment, FIG. 2B is an enlarged view of area A of FIG. 2A, and FIG. 2C is a cross-sectional view of the receptacle connector of FIG. 2A viewed from a different direction, according to an embodiment.

Referring to FIGS. 2A to 2C, a receptacle connector 200 may include a terminal 210, a core body 220, a main body 230, a shell 240, and a gap 260. Herein, the core body 220 and the main body 230 may be collectively referred to as a mold body.

The receptacle connector 200 may be manufactured by a multi-component injection method. In the receptacle connector 200, the core body 220 may be manufactured to accommodate the terminal 210, the main body 230 may be separately manufactured from the core body 220, and the core body 220 may bond to the main body 230. The core body 220 and the main body 230 may be injection molds. A fine gap 260 may be formed at a joint portion of injection molds. The gap 260 may be disposed on an area that is not exposed to the outside. As the gap 260 is disposed on an area that is not exposed to the outside, an inflow of moisture to the gap 260 may decrease.

The moisture flowing through the gap 260 may not easily dry because the width of the gap 260 is narrow. The moisture flowing through the gap 260 may affect the performance of the receptacle connector 200. The performance of the receptacle connector 200 may be maintained by preventing moisture from easily entering through the gap 260.

The receptacle connector 200 may be implemented in a substrate (e.g., a printed circuit board (PCB)). The receptacle connector 200 may be coupled to a plug connector. The plug connector may proceed in the −x direction and may be coupled to the receptacle connector.

Herein, a front direction of the receptacle connector may be a direction from the receptacle connector toward a corresponding plug connector when the receptacle connector is coupled to the plug connector. On the other hand, a rear direction of the receptacle connector herein may be a direction opposite to the front direction of the receptacle connector. Herein, the front direction of the receptacle connector may be referred to as a first direction and the rear direction of the receptacle connector may be referred to as a second direction.

In addition, herein, a front end of the receptacle connector may be an end portion of the receptacle connector disposed in front of the receptacle connector. On the other hand, herein, a rear end of the receptacle connector may be an end portion of the receptacle connector disposed in the rear direction of the receptacle connector.

The receptacle connector 200 may be inserted into a case 250. For example, the case 250 may form an external appearance of an electronic device (e.g., the electronic device 101 of FIG. 1). The case 250 may include a hollow therein to accommodate various components of the electronic device (e.g., the electronic device 101 of FIG. 1). The case 250 may include a case body 251 and a case stopper 252 protruding from an inner side surface of the case body 251. Based on FIG. 2A, a surface of the case 250 facing the +x direction may be exposed to the outside.

The shell 240 may be provided inside the case 250. The shell 240 may include a shell body 241, a shell stopper 242 connected to the shell body 241, and a shell protrusion 243 that protrudes from an outer side surface of the shell body 241 and is able to be caught by the case stopper 252. The shell protrusion 243 may be inserted in the first direction, for example, the +x direction, inside the case 250 and may be caught by the case stopper 252. The shell stopper 242 may be integrally formed with the shell body 241 or may be connected to the shell body 241 as a separate object.

The terminal 210 may be disposed in the mold body. For example, the terminal 210 may be disposed in the core body 220. At least one terminal 210 may be provided. For example, a plurality of terminals 210 may be provided. The plurality of terminals 210 may be arranged on the mold body. For example, the plurality of terminals 210, which are each formed longitudinally in the x-axis direction, may be arranged in the y-axis direction. Some of the plurality of terminals 210 may be disposed on the front portion of the mold body and may be exposed to the outside.

The plurality of terminals 210 may include an upper terminal 210A and a lower terminal 210B. As shown in FIG. 2A, the upper terminal 210A may be upwardly exposed from the top surface of the mold body and the lower terminal 210B may be downwardly exposed from the bottom surface of the mold body.

The upper terminal 210A may include a first extension 211A, a second extension 212A, and a first mounting part 213A.

The first extension 211A may extend in the x-axis direction. A portion of the first extension 211A may be disposed on the top surface of the mold body and may be exposed from the mold body. The other portion of the first extension 211A may be completely enclosed by the mold body.

The second extension 212A may be connected to a rear end of the first extension 211A and may extend in the z-axis direction. The second extension 212A may be disposed inside the mold body and may be supported by the mold body. For example, as shown in the drawings, the second extension 212A may be bent once from the first extension 211A at about 45 degrees, may extend by a predetermined distance, and then may be bent once at about 45 degrees, again. In other words, the second extension 212A may have a shape bent twice. However, the shape of the second extension 212A is not limited thereto. For example, the second extension 212A may have a shape that is bent once at about 90 degrees.

The first mounting part 213A may extend from the second extension 212A and may be exposed to the outside from the mold body. For example, the first mounting part 213A may extend from the lower part of the second extension 212A in the x-axis direction and may be disposed on the lower side of the mold body.

The first mounting part 213A may perform a function to mount the upper terminal 210A on a substrate on which the receptacle connector is disposed. For example, the first mounting part 213A may be mounted on a substrate by a method, such as soldering. Because the mold body may support the first extension 211A and/or the second extension 212A, the upper terminal 210A mounted by the first mounting part 213A may fasten the mold body to the substrate on which the receptacle connector is disposed.

The lower terminal 210B may include, for example, a third extension 211B, a fourth extension 212B, and a second mounting part 213B.

The third extension 211B may extend in the x-axis direction. A portion of the first extension 211A may be disposed on the bottom surface of the mold body and may be exposed from the mold body. The other portion of the first extension 211A may be completely enclosed by the mold body.

The fourth extension 212B may be connected to a rear end of the third extension 211B and may extend in the z-axis direction. The fourth extension 212B may be disposed inside the mold body and may be supported by the mold body.

The second mounting part 213B may extend from the fourth extension 212B and may be exposed to the outside from the mold body. For example, the second mounting part 213B may extend from the lower part of the fourth extension 212B in the x-axis direction and may be disposed on the lower side of the mold body.

The second mounting part 213B may perform a function to mount the lower terminal 210B on a substrate on which the receptacle connector is disposed. For example, the second mounting part 213B may be mounted on a substrate by a method, such as soldering. Because the mold body may support the third extension 211B and/or the fourth extension 212B, the lower terminal 210B mounted by the second mounting part 213B may fasten the mold body to the substrate on which the receptacle connector is disposed.

The terminals 210A and 210B may include conductive substances, respectively. For example, the terminals 210A and 210B may include a copper alloy. However, the disclosure is not limited thereto.

The plurality of terminals 210 may include a signal terminal 217, a power terminal 218, and a ground terminal 219.

The signal terminal 217 may input or output a data electrical signal. For example, when the receptacle connector is coupled to a corresponding plug connector, the signal terminal 217 may be electrically connected to a signal terminal of the plug terminal.

The power terminal 218 may be arranged side by side with the signal terminal 217 and may input or output a power electrical signal. For example, when the receptacle connector is coupled to a corresponding plug connector, the power terminal 218 may be electrically connected to a power terminal of the plug terminal.

The ground terminal 219 may be arranged side by side with the signal terminal 217 and the power terminal 218 and may prevent electromagnetic interference due to a high-speed signal. For example, when the receptacle connector 200 is coupled to the plug connector, the ground terminal 219 may be electrically connected to a ground terminal of the plug connector and may be grounded.

The plurality of terminals 210 may be arranged in a form satisfying a universal serial bus (USB) type-C pin standard. Since a terminal of the USB type-C does not limit the connecting direction of the plug connector to one direction, there is an advantage of easy attachment or detachment of the plug connector.

The core body 220 may include a core base 221 supporting the plurality of terminals 210 and a parting part 222 protruding from the core base 221. The core body 220 may be an injection mold and the parting part 222 may be a parting line formed at a portion that becomes a dividing surface of a mold used to manufacture an injection mold.

The core body 220 may include at least one injection part. In the embodiment of FIGS. 2A-2C, the core body 220 includes two injection parts. However, the disclosure is not limited thereto. For example, the core body 220 may include one injection part that is integrally formed or three or more injection parts.

For example, the core base 221 may include a first base 221A supporting the upper terminal 210A and a second base 221B supporting a lower terminal 210B. The parting part 222 may protrude from the first base 221A. The first base 221A and the parting part 222 may be a first injection part manufactured by one process and the second base 221B may be a second injection part manufactured by another process. For example, the first injection part may be connected to the upper terminal 210A, and the second injection part may be connected to the lower terminal 210B. The first injection part and the second injection part may be sequentially manufactured or may be individually manufactured and bond to each other.

For example, while the upper terminal 210A is mounted on a mold, the first injection part may be manufactured by injecting, into the mold, an injection mold for manufacturing the first injection part. The first injection part may be manufactured to be fixed to a state in which the first injection part supports the upper terminal 210A. While sequentially mounting the first injection part and the upper terminal 210A on the mold and mounting the lower terminal on the mold, the core body 220 may be manufactured by injecting, into the mold, an injection mold for manufacturing the second injection part.

For example, while the upper terminal 210A is mounted on the mold, the first injection part may be manufactured by injecting, into the mold, an injection mold for manufacturing the first injection part. Separately from the first injection part, while the lower terminal 210B is mounted on the mold, the second injection part may be manufactured by injecting, into the mold, an injection mold for manufacturing the second injection part. The core body 220 may be manufactured by bonding the first injection part to the second injection part.

The mold for manufacturing the first injection part may be the same as or different from the mold for manufacturing the second injection part. A first injection mold and a second injection mold may include the same material or different materials.

For example, the parting part 222 may be integrally formed or may be segmented into a plurality of pieces as shown in FIG. 2C. The plurality of segmented parting parts 222 may be spaced apart from each other in the y-axis direction.

A surface of the parting part 222 exposed toward the inner side surface of the shell body 241 may be spaced apart from a main protrusion 2311 in the −x direction. It should be noted that an edge of the surface of the parting part 222 exposed toward the inner side surface of the shell body 241 may be parallel with an edge of the main protrusion 2311.

The main body 230 may be a separate injection mold from the core body 220. The main body 230 and the core body 220 may be sequentially manufactured or may be individually manufactured and bond to each other. The main body 230 and the core body 220 may include the same material or different materials.

The fine gap 260 may be formed on a bonding surface of the main body 230 and the core body 220. The gap 260 may communicate an outer side and an inner side of the main body 230 to each other. The receptacle connector 200 in an embodiment may dispose the gap 260 on an area that is not exposed to the outside to prevent or reduce an inflow of moisture into the main body 230 through the gap 260. In this case, the area that is not exposed to the outside may be an area that is not exposed to the outside in the receptacle connector 200. For example, the front end of the receptacle connector 200 may be exposed in the +x direction to be coupled to the plug connector, and an exposed area to be coupled to the plug connector in the receptacle connector 200 may be referred to as an "area exposed to the outside" and an area that is not exposed may be referred to as an "area that is not exposed to the outside". The area exposed to the outside may be an area positioned in the +x direction relative to the shell stopper 242 and the area that is not exposed to the outside may be an area positioned in the −x direction relative to the shell stopper 242.

The main body 230 may include a center part 231, an exposed part 232, and a non-exposed part 233. For example, the center part 231, the exposed part 232, and the non-exposed part 233 may be integrally formed as one.

The center part 231 may include the main protrusion 2311 that may be caught by the shell stopper 242 by moving in the first direction, for example, the +x direction, in the shell 240. The main protrusion 2311 may be in surface contact with the shell stopper 242. The main protrusion 2311 may set a position of the main body 230 such that the main body 230 does not escape in the +x direction by passing through the shell 240. For example, the main protrusion 2311 may be formed in a ring shape around an axis parallel with the x-axis along an outer circumferential surface of the center part 231. For example, the main protrusion 2311 and the shell stopper 242 may be fastened to each other through an adhesive.

The exposed part 232 may protrude from the center part 231 in the first direction, for example, the +x direction, and may cover at least a portion of the terminal 210. The exposed part 232 and the core body 220 may fix a position of the first extension 211A of the upper terminal 210A and a position of the third extension 211B of the lower terminal 220A. The exposed part 232 may be disposed on an area exposed to the outside and a portion of the terminal 210 that is not covered by the exposed part 232 may be exposed to the outside.

A joint portion between the exposed part 232 and the core base 221 may be covered by the main body 230 and/or the terminal 210. Since the joint portion of the exposed part 232 and the core base 221 is provided inside the main body 230, an inflow of moisture through the joint portion of the exposed part 232 and the core base 221 may decrease or may be prevented.

The non-exposed part 233 may protrude from the center part 231 in the second direction, for example, in the −x direction. The non-exposed part 233 may bond to the parting part 222 of the core body 220. The core body 220 may bond to the main body 230 in the non-exposed part 233 instead of the exposed part 232, the fine gap 260 between the parting part 222 of the core body 220 and the non-exposed part 233 of the main body 230 may be disposed on an area that is not exposed to the outside. Since the gap 260 is disposed on an area that is not exposed to the outside where moisture is not able to easily reach, an inflow of moisture through the gap 260 may decrease or may be prevented as the gap 260 is disposed on the area that is not exposed to the outside.

The non-exposed part 233 may enclose the parting part 222. For example, the parting part 222 may protrude from the core base 221 in the +z direction. The non-exposed part 223 may have a shape enclosing the parting part 222 based on an axis parallel with the z-axis. A joint portion between the non-exposed part 233 and the parting part 222 may be open in a direction toward the +z direction.

The gap 260 may be formed on a joint portion of the parting part 222 and the main body 230. For example, the gap 260 may be formed on a joint portion of the parting part 222 and the non-exposed part 233 or a joint portion of the parting part 222 and the center part 231. In this case, the joint portion may be portions of the parting part 222 and the main body 230 facing and contacting each other. Since the core body 220 and the main body 230 are formed as individual injection molds, a fine gap may be formed between the parting part 222 and the main body 230. For ease of description, in the drawings, illustrated is that the gap 260 has predetermined intervals. However, intervals of the gap 260 may not be constant and a portion of the joint portion of the parting part 222 and the main body 230 may be fully bonded.

The gap 260 may be open toward the inner side surface of the shell body 241. The gap 260 may be disposed in the second direction, for example, in the −x direction, based on the shell stopper 242. For example, the gap 260 may be open from the rear side of the shell stopper 242, for example, the shell stopper 242, toward the inner side surface of the shell body 241 provided in the −x direction.

Figure 3:
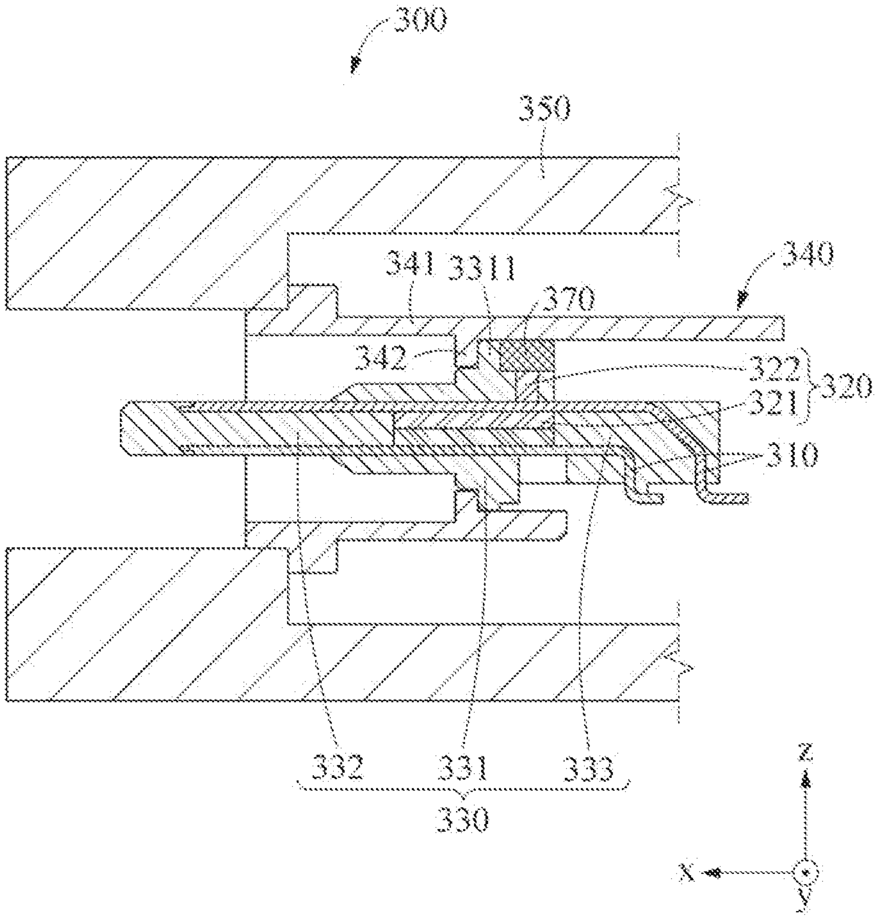
FIG. 3 is a cross-sectional view of a receptacle connector according to an embodiment.

FIG. 3 is a cross-sectional view of a receptacle connector according to an embodiment.

Referring to FIG. 3, a receptacle connector 300 may include a terminal 310, a core body 320, a main body 330, a shell 340, a case 350, and a gap, and a resin layer 370.

The shell 340 may be mounted on the case 350. A mold body may be provided inside the shell 340. The mold body may be provided in a state in which the main body 330 is caught by the shell stopper 342 of the shell body 341 of the shell 340.

The mold body may include a plurality of injection molds. For example, the mold body, the core body 320, and the main body 330 may include injection molds, respectively. A fine gap may be formed at a joint portion between the core body 320 and the main body 330.

The main body 330 may include a center part 331, an exposed part 332 protruding from the center part 331 in the +x direction toward an area exposed to the outside, and a non-exposed part 333 protruding from the center part 331 in the −x direction toward an area that is not exposed to the outside.

The resin layer 370 may decrease an inflow of moisture from the exposed part 332 into the non-exposed part 333. The main body 330 and the shell 340 may be spaced apart from each other in the z-axis direction and the resin layer

370 may be provided between the main body 330 and the shell 340. The resin layer 370 may seal at least a portion of a space between the main body 330 and the shell 340.

The resin layer 370 may cover a joint portion of the core body 320 and the main body 330. For example, the resin layer 370 may cover a joint portion between the parting part 322 of the core body 320 and the non-exposed part 333 of the main body 330. Even if moisture flows into near the non-exposed part 333, for example, the area that is not exposed to the outside, the resin layer 370 may decrease or prevent an inflow of moisture in the area that is not exposed to the outside into the inside of the main body 330, for example, toward the core base 321 of the core body 320. As the resin layer 370 covers the joint portion of the parting part 322 and the non-exposed part 333, an inflow of moisture along a gap formed at the joint portion of the parting part 322 and the non-exposed part 333 may decrease or may be prevented. The resin layer 370 may contact the inner side surface of the shell body 341 and may be overlapped with the main body 330 in the first direction, for example, the +x direction.

The resin layer 370 may be, for example, provided in an area where the joint portion of the parting part 322 and the non-exposed part 333 is disposed, yet may not be provided in an area where the joint portion of the parting part 322 and the non-exposed part 333 is not disposed. According to the structure described above, while forming the size of the resin layer 370 to be small, an inflow of moisture through a gap between the parting part 322 and the non-exposed part 333 may be prevented or may decrease.

After resin in a liquid state is injected into the area where the joint portion of the parting part 322 and the non-exposed part 333 is disposed, the resin layer 370 may be formed by thermal curing or organic curing.

Figure 4:
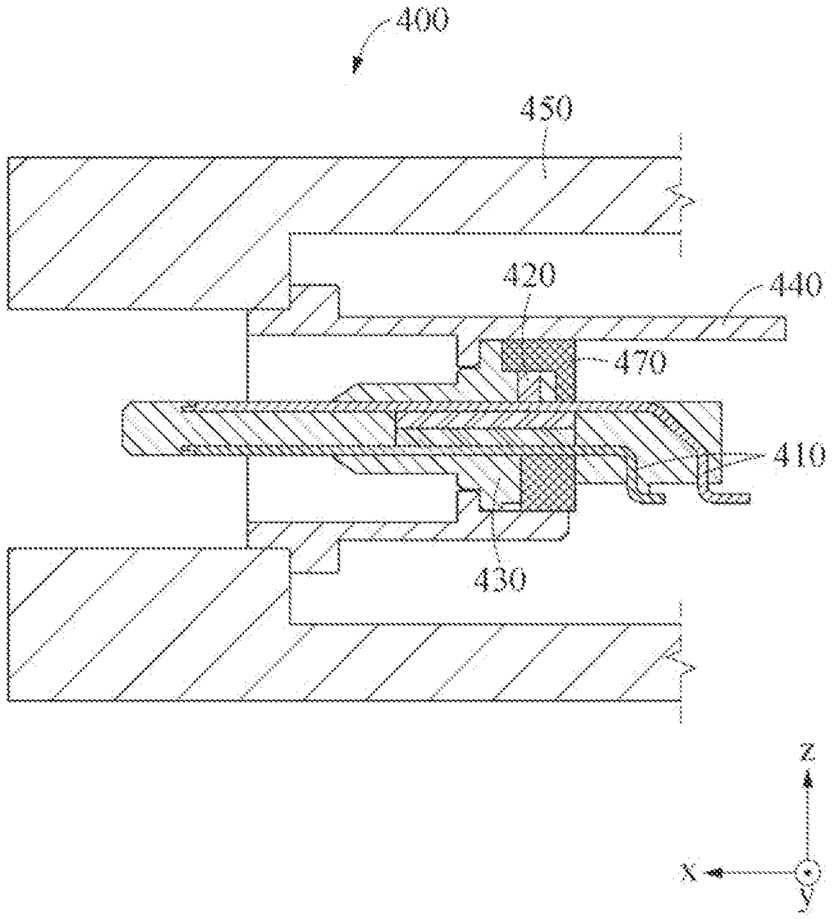
FIG. 4 is a cross-sectional view of a receptacle connector according to an embodiment.

FIG. 4 is a cross-sectional view of a receptacle connector according to an embodiment.

Referring to FIG. 4, a receptacle connector 400 may include a terminal 410, a core body 420, a main body 430, a shell 440, a case 450, a gap, and a resin layer 470.

The resin layer 470 may cover a joint portion of the core body 420 and the main body 430. Even if moisture flows into an area that is not exposed to the outside, the resin layer 470 may decrease or prevent an inflow of moisture in the area that is not exposed to the outside into the inside of the main body 430.

The resin layer 470 may enclose the main body 430 and may contact an inner side surface of the shell 440 and an outer side surface of the main body 430. In other words, the resin layer 470 may have a ring shape. As the resin layer 470 encloses the main body 430 and contacts the inner side surface of the shell 440 and the outer side surface of the main body 430, a watertight structure may be formed between the main body 430 and the shell 440 and an inflow of moisture from an area exposed to the outside into an area that is not exposed to the outside may be prevented or decrease.

Figure 5A:
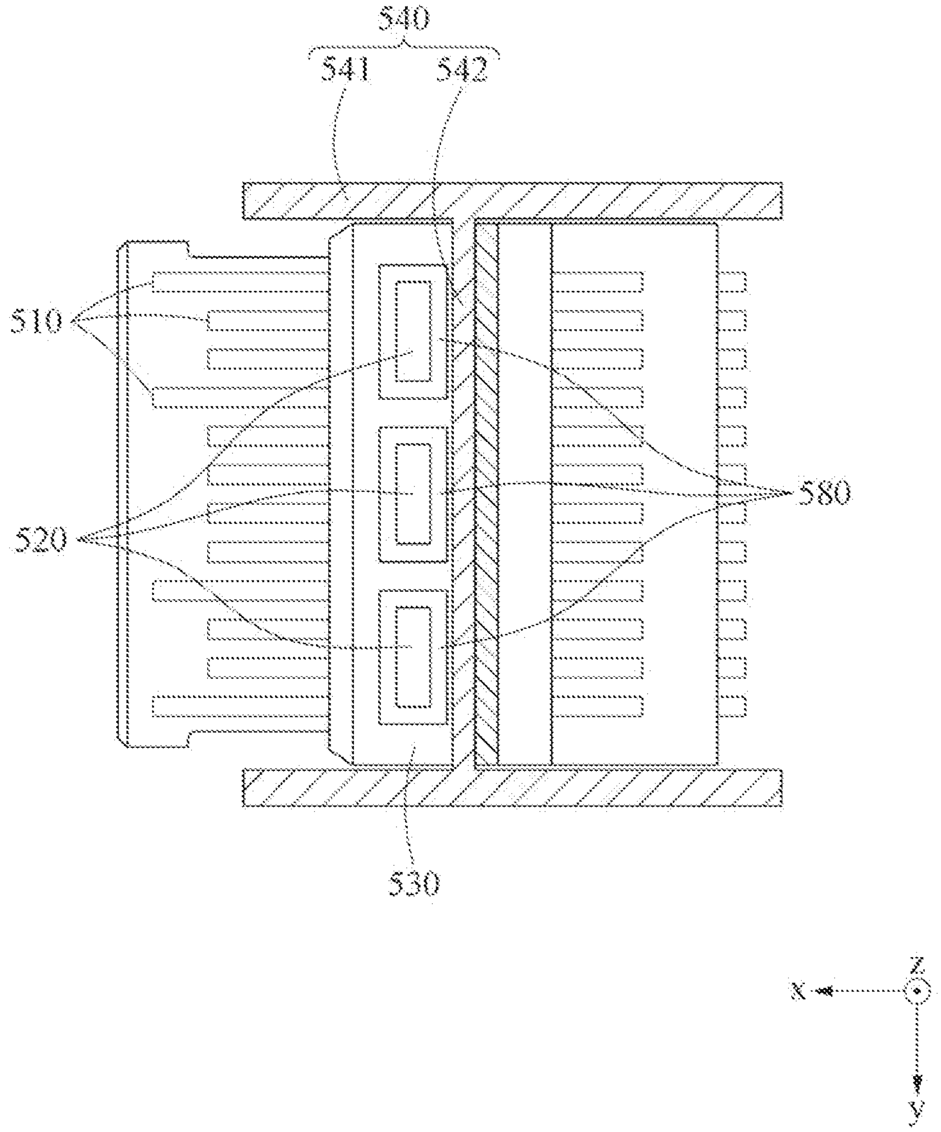
FIG. 5A is a cross-sectional view of a receptacle connector according to an embodiment.
Figure 5B:
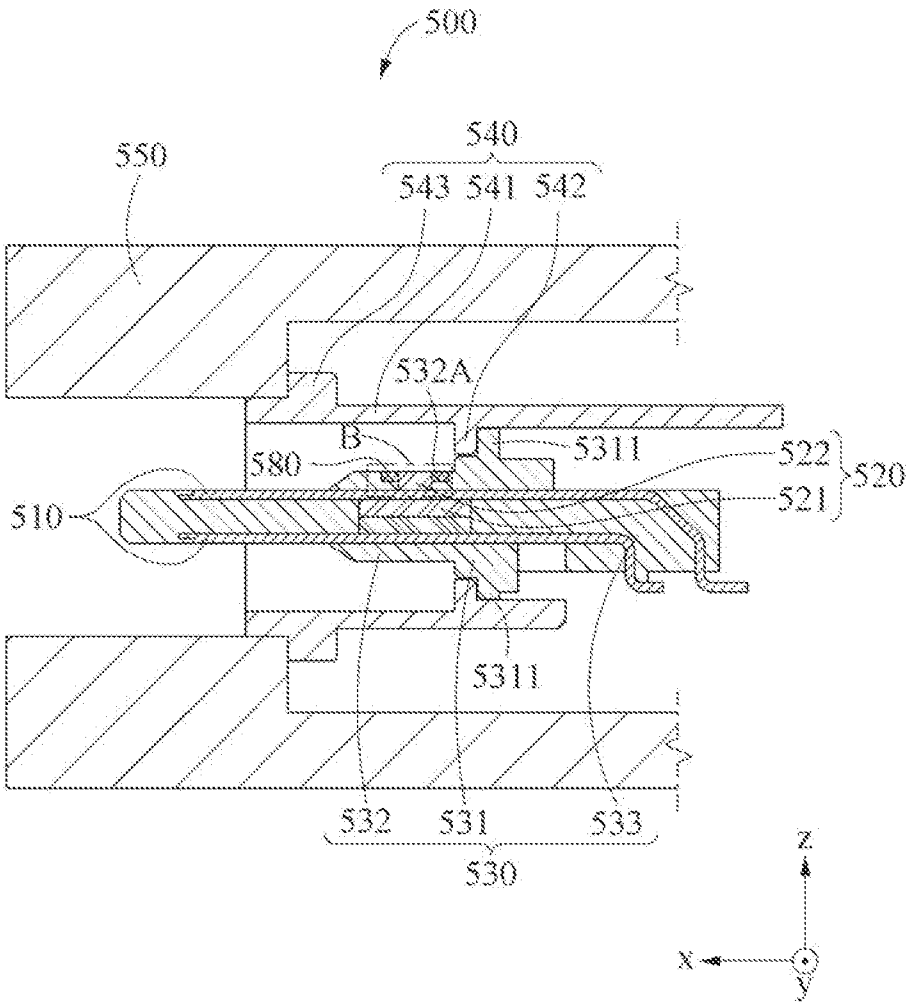
FIG. 5B is a cross-sectional view of the receptacle connector of FIG. 5A when viewed from a different direction, according to an embodiment.
Figure 5C:
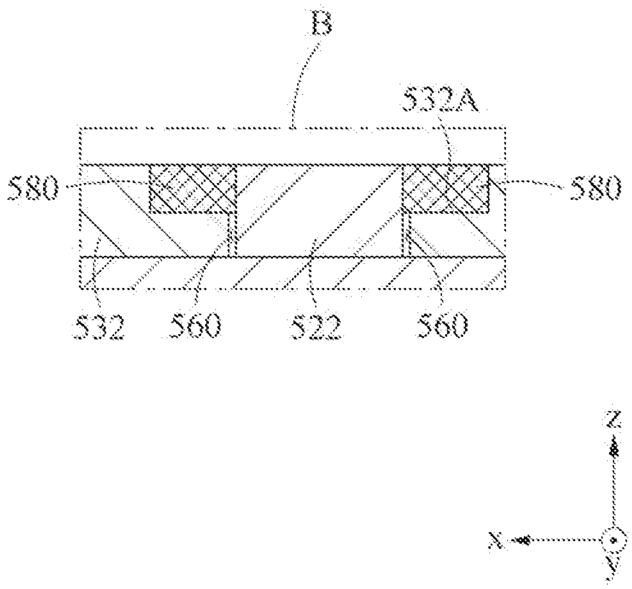
FIG. 5C is an enlarged view of area B of FIG. 5B.

FIG. 5A is a cross-sectional view of a receptacle connector according to an embodiment, FIG. 5B is a cross-sectional view of the receptacle connector from a different direction from FIG. 5A according to an embodiment, and FIG. 5C is an enlarged view of B of FIG. 5B.

Referring to FIGS. 5A to 5C, a receptacle connector 500 may include a terminal 510, a core body 520, a main body 530, a shell 540, a case 550, a gap 560, and a resin layer 580. The core body 520 may include a core base 521 and a parting part 522. The main body 530 may include a center part 531, an exposed part 532, and a non-exposed part 533. The shell 540 may be mounted on the case 550. The shell 540 may include a shell body 541, a shell stopper 542 protruding from an inner side surface of the shell body 541, and a shell protrusion 543 protruding from an outer side surface of the shell body 541 and caught by the case 550. The center part 531 may include a main protrusion 5311 that may be caught by the shell stopper 542. A mold body may be provided inside the shell 540. The mold body may be provided while the main body 530 is caught by the shell stopper 542 of the shell 540.

A fine gap 560 may be formed at a joint portion between the core body 520 and the main body 530. For example, the gap 560 may be formed between the parting part 522 and the exposed part 532.

The exposed part 532 may include a resin groove 532A for arranging the resin layer 580. The resin groove 532A may be recessed in one surface of the exposed part 532. For example, the resin groove 532A may be formed on a surface of the exposed part 532 facing the +z direction and may be recessed in the −z direction.

The resin layer 580 may be provided at the resin groove 532A. The resin layer 580 may decrease or prevent an inflow of moisture through the gap 560 formed between the core body 520 and the main body 530, specifically the gap 560 formed between the parting part 522 and the exposed part 532. The resin layer 580 may be formed by curing after filling a space between the parting part 522 and the exposed part 532 with resin in a liquid state. The resin layer 580 may enclose the parting part 522 in a circumferential direction.

One side of the gap 560 formed between the parting part 522 and the exposed part 532 may be formed on a bottom surface of the resin groove 532A. When the resin layer 580 is provided at the resin groove 532A by the structure described above, an inflow of moisture through the gap 560 formed between the parting part 522 and the exposed part 532 may decrease or be prevented.

A plurality of parting parts 522 may be provided and the plurality of parting parts 522 may be spaced apart from each other in the y-axis direction, which is a third direction perpendicular to the first direction.

The number of resin grooves 532A and the number of resin layers 580 may correspond to the number of parting parts 522. For example, when three parting parts 522 are formed, three resin grooves 532A and three resin layers 580 may be formed. When one of the plurality of resin layers 580 is damaged, only the damaged resin layer 580 may be selectively replaced, and thus, maintenance may be easy.

Even when the gap 560 formed between the parting part 522 and the exposed part 532 is disposed on an area that is exposed to the outside, the resin layer 580 may prevent or decrease an inflow of moisture through the gap.

Figure 6A:
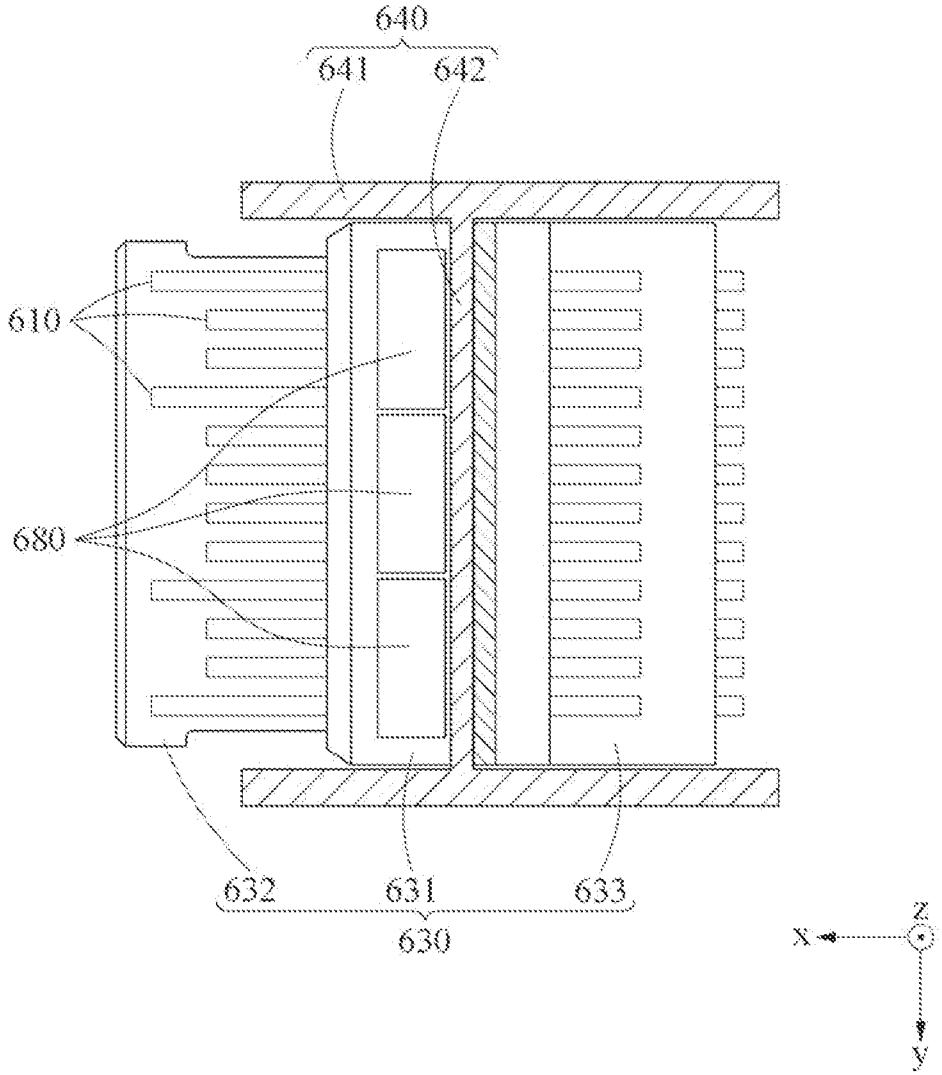
FIG. 6A is a cross-sectional view of a receptacle connector according to an embodiment.
Figure 6B:
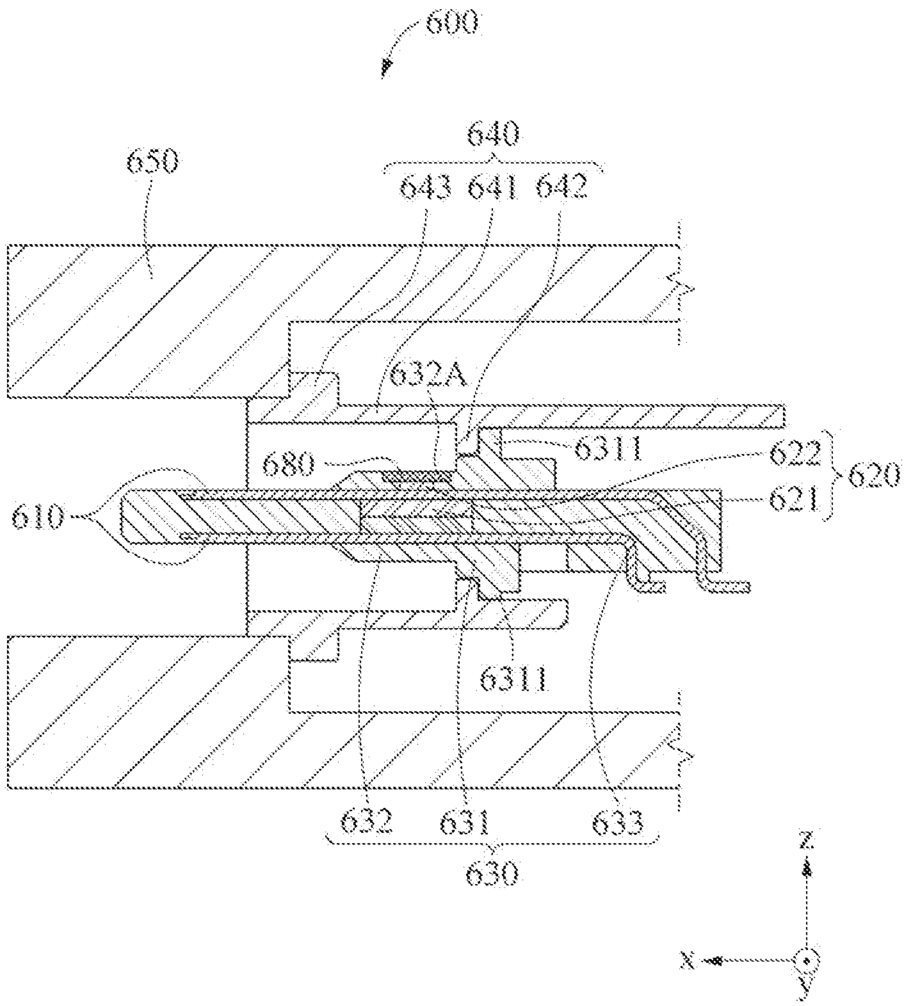
FIG. 6B is a cross-sectional view of the receptacle connector of FIG. 6A when viewed from a different direction, according to an embodiment.

FIG. 6A is a cross-sectional view of a receptacle connector according to an embodiment, and FIG. 6B is a cross-sectional view of the receptacle connector from a different direction from FIG. 6A according to an embodiment.

Referring to FIGS. 6A and 6B, a receptacle connector 600 may include a terminal 610, a core body 620, a main body 630, a shell 640, a case 650, a gap, and a resin layer 680. The core body 620 may include a core base 621 and a parting part 622. The main body 630 may include a center part 631, an exposed part 632, and a non-exposed part 633. The shell 640 may be mounted on the case 650. The shell 640 may include a shell body 641, a shell stopper 642, and a shell protrusion 643. A mold body may be provided inside the shell 640. The mold body may be provided while the main body 630 is caught by the shell stopper 642 of the shell 640.

A fine gap may be formed at a joint portion between the core body 620 and the main body 630. For example, the gap may be formed between the parting part 622 and the exposed part 632.

The exposed part 632 may include a resin groove 632A for arranging the resin layer 680. The resin groove 632A may be recessed in one surface of the exposed part 632.

The resin layer 680 may be provided at the resin groove 632A. The resin layer 680 may decrease or prevent an inflow of moisture through the gap formed between the core body 620 and the main body 630, specifically the gap formed between the parting part 622 and the exposed part 632. The gap may be open from the bottom surface of the resin groove 632A toward the resin layer 680.

The resin layer 680 may fill the resin groove 632A and may cover the bottom surface of the resin groove 632A, the gap, and the top surface of the parting part 622. For example, the bottom surface of the resin groove 632A may be approximately parallel with the top surface of the parting part 622. The resin layer 680 may be formed by curing after filling the resin groove 632A.

Figure 7A:
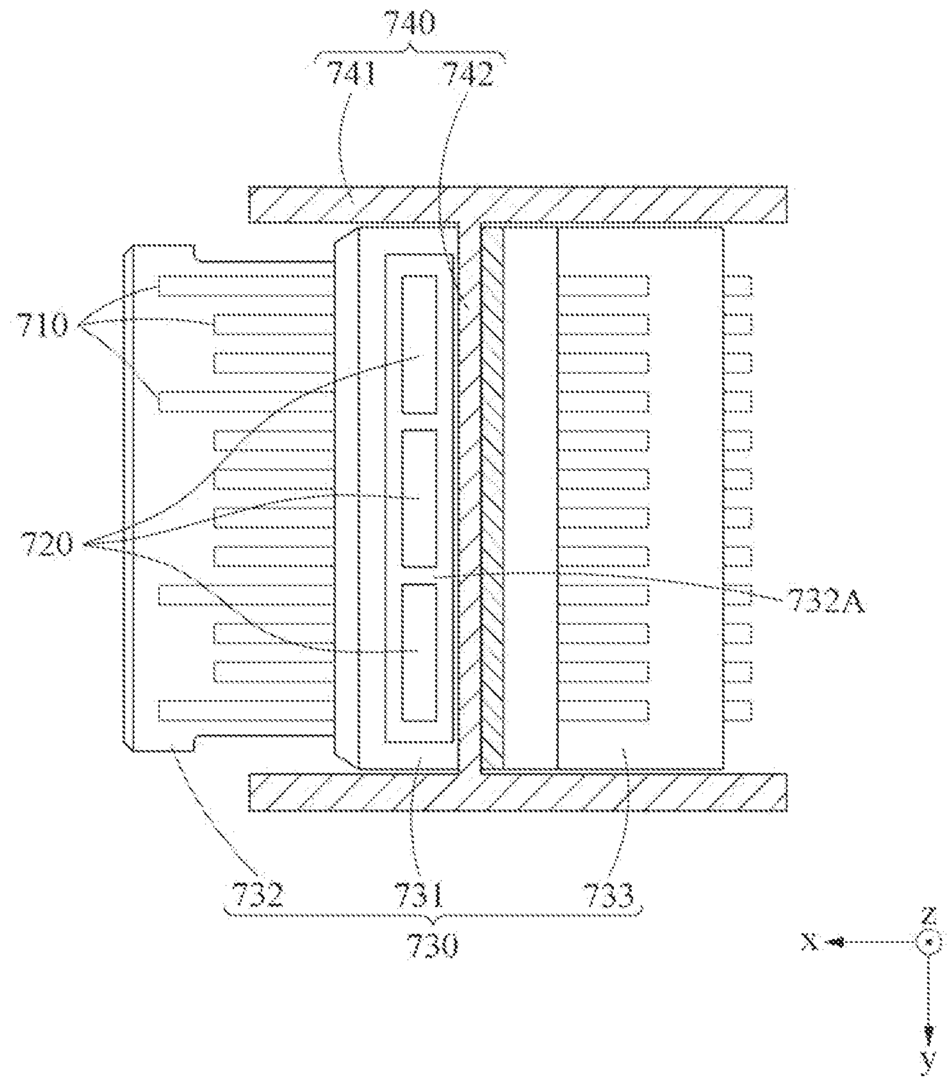
FIG. 7A is a cross-sectional view of a receptacle connector wherein a resin layer is omitted according to an embodiment.
Figure 7B:
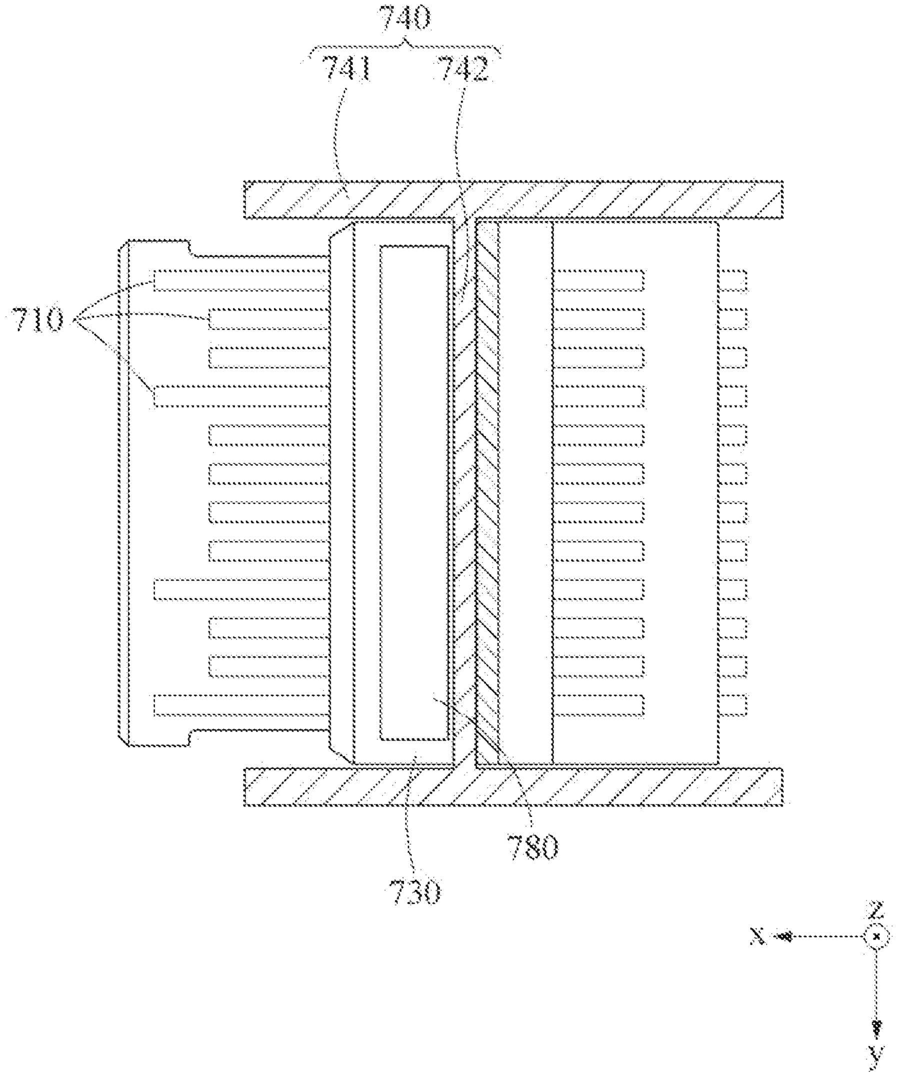
FIG. 7B is a cross-sectional view of a receptacle connector according to an embodiment.

FIG. 7A is a cross-sectional view of a receptacle connector of which a resin layer is omitted according to an embodiment, and FIG. 7B is a cross-sectional view of a receptacle connector according to an embodiment.

Referring to FIGS. 7A and 7B, a receptacle connector 700 may include a terminal 710, a core body 720, a main body 730, a shell 740, a gap, and a resin layer 780. The main body 730 may include a center part 731, an exposed part 732, and a non-exposed part 733. The shell 740 may include a shell body 741 and a shell stopper 742. A mold body may be provided inside the shell 740. The mold body may be provided while the main body 730 is caught by the shell stopper 742 of the shell 740. A fine gap may be formed at a joint portion between the core body 720 and the main body 730.

The exposed part 732 may include a resin groove 732A for arranging the resin layer 780. The resin groove 732A may be recessed in one surface of the exposed part 732. The resin groove 732A may enclose a plurality of core bodies 720.

The resin layer 780 may be provided at the resin groove 732A. For example, the resin layer 780 may decrease or prevent an inflow of moisture through a gap formed between the core body 720 and the main body 730. As one resin groove 732A is formed, the resin layer 780 may be integrally formed as one. When the resin layer 780 is integrally formed as one, the resin in a liquid state may be injected at once instead of dividing and injecting the resin into a plurality of times, and thus, the resin layer 780 may be easily formed.

For example, the resin layer 780 may fill the resin groove 732A and may cover the bottom surface of the resin groove 732A, the gap, and the top surface of the parting part 722. For example, the bottom surface of the resin groove 732A may be approximately parallel with the top surface of the parting part 722. The resin layer 780 may be formed by curing after filling the resin groove 732A.

For example, the top surface of the parting part 722 may not be covered by the resin layer 780 and may be exposed to the outside. Even if such a structure is adopted, the resin layer 780 may cover the bottom surface of the resin groove 732A and the gap.

Figure 8:
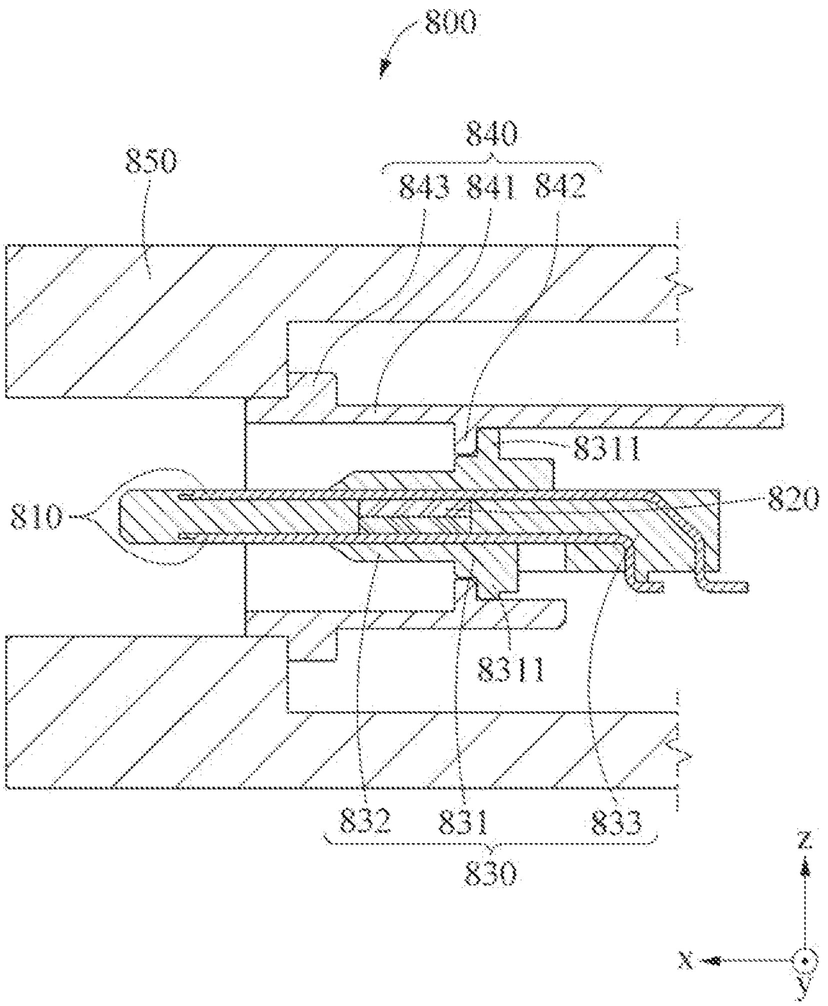
FIG. 8 is a cross-sectional view of a receptacle connector according to an embodiment.

FIG. 8 is a cross-sectional view of a receptacle connector according to an embodiment.

Referring to FIG. 8, a receptacle connector 800 may include a terminal 810, a core body 820, a main body 830, a shell 840, a case 850, a gap 860, and a resin layer 880. The main body 830 may include a center part 831 inserted in a first direction, for example, the +x direction, in the shell 840 and caught by the shell 840, an exposed part 832 protruding in the first direction from the center part 831 and partially covering the terminal 810, and a non-exposed part 833 protruding in a second direction, for example, the −x direction from the center part 831. The shell 840 may be mounted on the case 850. The shell 840 may include a shell body 841, a shell stopper 842 protruding from an inner side surface of the shell body 841, and a shell protrusion 843 protruding from an outer side surface of the shell body 841 and caught by the case 850. The center part 831 may include a main protrusion 8311 that may be caught by the shell stopper 842. A mold body may be provided inside the shell 840. The mold body may be provided while the main body 830 is caught by the shell stopper 842.

The core body 820 may be disposed inside the main body 830. The main body 830 and the terminal 810 may enclose the core body 820 and one side of a joint portion of the core body 820 and the main body 830 may not be exposed to the outside. The core body 820 may not include a parting line. For example, when the core body 820 is manufactured from a mold, a user may manufacture the core body 820 by removing a parting line.

According to an embodiment, the receptacle connector 200 may include the shell 240 including the shell body 241 and the shell stopper 242 protruding from the inner side surface of the shell body 241, a terminal 210 provided inside the shell body 241, the core body 220 including the core base 221 supporting the terminal 210 and the parting part 222 protruding from the core base 221, and the main body 230 including the center part 231 including the main protrusion 2311 that moves in a first direction in the shell 240 and is able to be caught by the shell stopper 242, the exposed part 232 protruding in the first direction from the center part 231 and covering at least a portion of the terminal 210, and the non-exposed part 233 bonding to the parting part 222 and protruding in a second direction, which is an opposite direction to the first direction, from the center part 231.

According to one or more embodiments, the receptacle connector 200 may further include a gap that is formed at a joint portion of the parting part and the non-exposed part and open toward the inner side surface of the shell body.

According to one or more embodiments, the gap may be disposed in the second direction relative to the shell stopper.

According to one or more embodiments, a joint portion between the exposed part and the core base may be covered by the main body or the terminal.

According to one or more embodiments, the non-exposed part may enclose the parting part.

According to one or more embodiments, the receptacle connector 200 may further include a resin layer decreasing an inflow of moisture into the non-exposed part.

According to one or more embodiments, the resin layer may cover the joint portion of the parting part and the non-exposed part.

According to one or more embodiments, the resin layer may contact the inner side surface of the shell body and may overlap the main body in the first direction.

According to one or more embodiments, the receptacle connector 200 may further include a case including a case body and a case stopper protruding from an inner side surface of the case body and the shell may further include a shell protrusion that is inserted into the first direction in the case and is able to be caught by the case stopper.

According to one or more embodiments, a plurality of terminals may be provided and the plurality of terminals may be disposed in a form satisfying the USB type-C pin standard.

According to one or more embodiments, the core body may include a first injection part including the parting part and a portion of the core base, and a second injection part including the other portion of the core base and bonding to the first injection part.

According to one or more embodiments, a plurality of terminals may be provided and one of the plurality of terminals may be connected to the first injection part and another one of the plurality of terminals may be connected to the second injection part.

According to one or more embodiments, the receptacle connector 500 may include the shell 540 including the shell body 541 and the shell stopper 542 protruding from the inner side surface of the shell body 541, the terminal 510 provided inside the shell body 541, the core body 520 including the core base 521 supporting the terminal 510 and the parting part 522 protruding from the core base 521, the main body including the center part 531 including the main protrusion that moves in a first direction in the shell 540 and is able to be caught by the shell stopper 542, the exposed part 532 protruding in the first direction from the center part 531, covering at least a portion of the terminal 510, bonding to the parting part 522, and including the resin groove 532A, and the non-exposed part 533 protruding in a second direction, which is an opposite direction to the first direction, from the center part 531, the gap 560 formed at a joint portion of the parting part 522 and the exposed part 532, and the resin layer 580 disposed on the resin groove 532A and decreasing an inflow of moisture into the gap 560.

According to one or more embodiments, the gap may be open toward the resin layer from a bottom surface of the resin groove.

According to one or more embodiments, a plurality of parting parts may be provided and the plurality of parting parts may be spaced part from each other in a third direction that is perpendicular to the first direction.

According to one or more embodiments, the resin layer may enclose the plurality of parting parts.

According to one or more embodiments, a plurality of resin layers may be provided and the plurality of resin layers may be spaced part from each other in the third direction that is perpendicular to the first direction and may enclose different parting parts, respectively.

According to one or more embodiments, the receptacle connector 800 may include the shell 840, the terminal 810 provided inside the shell 840, the core body 820 supporting the terminal 810, and the main body 830 including the center part 831 inserted in a first direction in the shell 840 and caught by the shell 840, the exposed part 832 protruding in the first direction from the center part 831 and covering at least a portion of the terminal 810, and the non-exposed part 833 protruding in a second direction, which is an opposite direction to the first direction, from the center part 831, wherein the core body 820 may be disposed inside the main body 830.

According to one or more embodiments, the main body and the terminal may enclose the core body.

What is claimed is:

1. A receptacle connector comprising:

a shell comprising a shell body and a shell stopper connected to the shell body;

a terminal provided inside the shell body;

a core body comprising a core base supporting the terminal and a parting part protruding from the core base; and a main body comprising:

a center part comprising a main protrusion configured to move in a first direction in the shell and to be caught by the shell stopper;

an exposed part protruding from the center part in the first direction and covering at least a portion of the terminal; and a non-exposed part protruding from the center part in a second direction opposite to the first direction, wherein the parting part is bonded to the center part or the non-exposed part.

2. The receptacle connector of claim 1, further comprising:

a gap formed at a joint portion between the parting part and the main body and opening toward an inner side surface of the shell body.

3. The receptacle connector of claim 2, wherein the gap extends in the second direction relative to the shell stopper.

4. The receptacle connector of claim 1, wherein a joint portion between the exposed part and the core base is covered by at least one of the main body and the terminal.

5. The receptacle connector of claim 1, wherein the non-exposed part encloses the parting part.

6. The receptacle connector of claim 1, further comprising a resin layer configured to decrease an inflow of moisture into the non-exposed part.

7. The receptacle connector of claim 6, wherein the resin layer covers a joint portion between the parting part and the non-exposed part.

8. The receptacle connector of claim 7, wherein the resin layer is configured to decrease an inflow of moisture in the second direction through a gap between the shell body and the main protrusion.

9. The receptacle connector of claim 7, wherein the resin layer contacts an inner side surface of the shell body and overlaps at least a portion of the main body in the first direction.

10. The receptacle connector of claim 1, further comprising:

a plurality of terminals including the terminal, the plurality of terminals being arranged in a to satisfy a universal serial bus (USB) type-C pin standard.

11. The receptacle connector of claim 1, wherein the core body further comprises:

a first injection part comprising a first portion of the core base and the parting part; and a second injection part bonded to the first injection part and comprising a second portion of the core base which is different from the first portion of the core base.

12. The receptacle connector of claim 11, further comprising a plurality of terminals including the terminal, wherein one of the plurality of terminals is connected to the first injection part and another one of the plurality of terminals is connected to the second injection part.

13. An electronic device comprising:

a case comprising a case body and a case stopper protruding from an inner side surface of the case body, wherein the case is configured to accommodate one or more components of the electronic device; and a receptacle connector disposed within the case, the receptacle connector comprising:

a terminal provided inside the case body;

a core body comprising a core base supporting the terminal and a parting part protruding from the core base; and a main body comprising:

a center part comprising a main protrusion configured to move in a first direction in the shell and to be caught by the case stopper;

an exposed part protruding from the center part in the first direction and covering at least a portion of the terminal; and a non-exposed part protruding from the center part in a second direction opposite to the first direction, wherein the parting part is bonded to the center part or the non-exposed part.

14. The electronic device of claim 13, wherein the receptacle connector further comprises a gap formed at a joint portion between the parting part and the main body, and wherein the gap opens toward the inner side surface of the case body.

15. The electronic device of claim 14, wherein the gap is disposed in the second direction relative to the case stopper.

16. The electronic device of claim 13, wherein a joint portion between the exposed part and the core base is covered by at least one of the main body and the terminal.

17. The electronic device of claim 13, wherein the non-exposed part encloses the parting part.

18. The electronic device of claim 13, wherein the core body further comprises:

a first injection part comprising a first portion of the core base and the parting part; and a second injection part bonded to the first injection part and comprising a second portion of the core base which is different from the first portion of the core base.

19. The electronic device of claim 18, wherein the receptacle connector further comprises a plurality of terminals including the terminal, and wherein one of the plurality of terminals is connected to the first injection part and another one of the plurality of terminals is connected to the second injection part.

20. A receptacle connector comprising:

a shell comprising a shell body and a shell stopper connected to the shell body;

a terminal provided inside the shell body;

a core body comprising a core base supporting the terminal and a parting part protruding from the core base;

a main body comprising:

a center part comprising a main protrusion configured to move in a first direction in the shell and to be caught by the shell stopper;

an exposed part protruding from the center part in the first direction and covering at least a portion of the terminal; and a non-exposed part protruding from the center part in a second direction opposite to the first direction; and a resin layer configured to decrease an inflow of moisture into the non-exposed part, wherein the parting part is bonded to the center part or the non-exposed part, and wherein the resin layer contacts an inner side surface of the shell body and is configured to decrease an inflow of moisture in the second direction through a gap between the shell body and the main protrusion.

* * * * *